United States Patent
Andoh

(10) Patent No.: US 8,532,861 B1
(45) Date of Patent: Sep. 10, 2013

(54) PROTECTIVE APPARATUS FOR ELECTRONIC UNIT ON UNMANNED SPACE EXPLORATION VEHICLE

(76) Inventor: Fukashi Andoh, Toyota (JP)

(*) Notice: Subject to any disclaimer, the term of this patent is extended or adjusted under 35 U.S.C. 154(b) by 0 days.

(21) Appl. No.: 13/487,169

(22) Filed: Jun. 2, 2012

(51) Int. Cl.
*G05D 1/00* (2006.01)

(52) U.S. Cl.
USPC ............ 701/23; 701/3; 701/13; 701/531; 244/158.1

(58) Field of Classification Search
None
See application file for complete search history.

(56) References Cited

U.S. PATENT DOCUMENTS

| | | | |
|---|---|---|---|
| 6,256,545 B1 * | 7/2001 | Kimura et al. | 700/28 |
| 6,615,110 B2 * | 9/2003 | Matsuo et al. | 700/245 |
| 7,288,912 B2 * | 10/2007 | Landry et al. | 318/580 |
| 7,459,871 B2 * | 12/2008 | Landry et al. | 318/580 |
| 7,958,981 B2 * | 6/2011 | Teraoka et al. | 188/322.15 |
| 8,005,630 B2 * | 8/2011 | Andoh et al. | 702/41 |
| 2003/0093392 A1 * | 5/2003 | Ulyanov | 706/13 |
| 2007/0032890 A1 * | 2/2007 | Zhou et al. | 700/63 |

* cited by examiner

*Primary Examiner* — Helal A Algahaim
*Assistant Examiner* — Rebecca Wagner

(57) ABSTRACT

A protective device for an electronic unit on a space exploration vehicle. A Laplace transform calculation unit generates a Laplace transform of an electronic unit state. A system parameter identification unit identifies system parameters based on the Laplace transform of electronic unit states. A Fourier transform calculation unit generates a ratio of the ground contacting mechanism state to a highest dominant frequency of the measured electronic unit state. A critical travel speed calculation unit generates a critical travel speed based on the identified system parameters. A calculation unit for threshold of travel speed generates a threshold of a travel speed based on the critical travel speed. An autonomous motion controller generates a control signal that drives the space exploration vehicle based on the threshold of the travel speed.

1 Claim, 9 Drawing Sheets

PROTECTIVE APPARATUS FOR ELECTRONIC UNIT ON UNMANNED SPACE EXPLORATION VEHICLE

BACKGROUND OF THE INVENTION

The present invention relates to a protective apparatus for electronic unit on space exploration vehicles capable of performing a space mission without a human intervention.

The space missions are, in general, conducted under harsh environmental conditions including sharp ambient temperature variation and rough terrain conditions on the planet in question, and are performed by electronically controlled unmanned space exploration vehicles that do not require an intervention by a remote human operator. Such space exploration vehicles are equipped with a plurality of sensors to detect environmental conditions, and an electronic unit to navigate the space exploration vehicle to the destination while preventing the damage to the space exploration vehicle based on the information from the plurality of sensors.

U.S. Pat. No. 5,436,839 discloses a navigation module for a semi-autonomous vehicle that computes a local path towards the destination while minimizing damage to the vehicle associated with a local terrain condition, utilizing fuzzy logic with the features of a terrain within a range measurable by a sensor module as its inputs.

The prior art in U.S. Pat. No. 5,436,839, if applied to the space exploration vehicle, fails to protect an electronic unit on the space exploration vehicle against a vibration from a ground under a sharp temperature variation, due to its inability to take into account an effect of an ambient temperature to a plurality of resonance frequencies of the space exploration vehicle.

SUMMARY OF THE INVENTION

The current invention provides a protective apparatus for electronic unit on unmanned space exploration vehicle capable of conducting a space mission under a sharp temperature variation while preventing the damage to the electronic unit on the space exploration vehicle due to the vibration from the ground.

The protective apparatus includes:
  an autonomous motion controller selecting a parameter identification mode if the autonomous motion controller is at a beginning of a space mission or receives a plurality of environmental variables from a plurality of environment sensors that deviate from the ones measured previously by more than a predetermined amount, selecting a normal operation mode if the autonomous motion controller is not at the beginning of the space mission and does not receive the plurality of environmental variables from the plurality of environment sensors that deviate from the ones measured previously by more than the predetermined amount, sending a control signal to a plurality of motors and a selected operation mode if the parameter identification mode is selected, where the control signal is a plurality of motor currents such that the space exploration vehicle travels at a constant travel speed for a predetermined time interval wherein an electronic unit state reaches steady state and makes a sudden stop, and sending a control signal required to perform a space mission if the normal operation mode is selected;
  a Laplace transform calculation unit receiving the selected operation mode and a measured electronic unit state from an electronic unit state sensor, calculating and sending a Laplace transform of the measured electronic unit state if in the parameter identification mode, and waiting until the selected operation mode becomes the parameter identification mode if in the normal operation mode;
  a system parameter identification unit receiving the Laplace transform of the measured electronic unit state, identifying and sending a plurality of identified system parameters;
  a Fourier transform calculation unit receiving the selected operation mode and waiting until the selected operation mode becomes the normal operation mode if in the parameter identification mode, receiving the selected operation mode, the measured electronic unit state from the electronic unit state sensor, and the ground contacting mechanism state from a plurality of ground contacting mechanism state sensors, calculating and sending a ratio of the ground contacting mechanism state to a highest dominant frequency of the measured electronic unit state if in the normal operation mode;
  a critical travel speed calculation unit receiving the plurality of identified system parameters from the system parameter identification unit, the ratio of the travel speed to the highest dominant frequency of the measured electronic unit state from the Fourier transform calculation unit, calculating and sending a critical travel speed at which the highest dominant frequency of the measured electronic unit state coincides with a first damped natural frequency of the space exploration vehicle; and
  a calculation unit for threshold of travel speed receiving the plurality of identified system parameters from the system parameter identification unit, the ratio of the travel speed to the first dominant frequency of the electronic unit state from the Fourier transform calculation unit, and the critical travel speed from the critical speed calculation unit, calculating and sending a threshold of travel speed, which the space exploration vehicle is controlled not to exceed, as a function of the critical travel speed and the plurality of identified system parameters.

This construction causes the highest frequency content of the vibration from the ground to remain sufficiently lower than a lowest damped natural frequency of the space exploration vehicle, and allows the electronic unit to avoid failure due to resonance regardless of sharp variations of environmental conditions influencing material properties of the space exploration vehicle.

BRIEF DESCRIPTION OF THE DRAWINGS

The novel features of the invention will be readily understood and appreciated by reference to the following detailed description taken in conjunction with the drawings, in which.

DETAILED DESCRIPTION OF THE INVENTION

Figure 3:
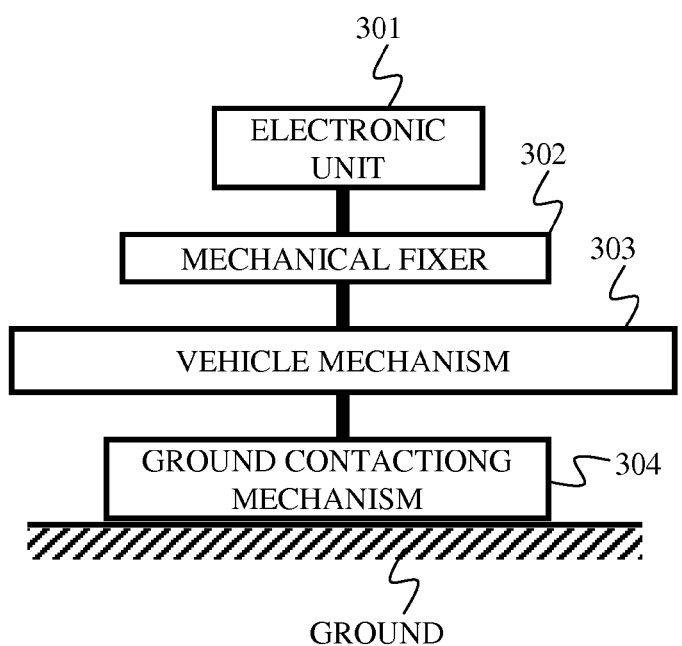
FIG. 3 is a general system configuration of a space exploration vehicle of the type of which an exemplary embodiment of the invention may be advantageously employed.

FIG. 3 is a general system configuration of a space exploration vehicle of a type of which an embodiment of the invention may be advantageously employed. The space exploration vehicle includes: an electronic unit 301, a mechanical fixer 302, a vehicle mechanism 303, and a ground contacting mechanism 304.

The electronic unit 301 is an electrical/electronic/programmable electronic system controlling a motion of the space exploration vehicle to perform a predetermined space mission while minimizing damage to the electronic unit 301 due to a vibration from the ground.

The mechanical fixer 302 mechanically connects the electronic unit 301 to the vehicle mechanism 303.

The vehicle mechanism 303 is a main mechanical structure of the space exploration vehicle that mechanically connects to a ground contacting mechanism 304.

The ground contacting mechanism 304 includes a plurality of wheels and a plurality of motors driving the space exploration vehicle on a ground which, in the embodiment that is shown, is an uneven terrain based on a control signal from the electronic unit 301 utilizing a reaction force from the ground.

A procedure whereby the electronic unit 301 generates the control signal to perform a predetermined space mission while minimizing damage to the electronic unit 301 due to the vibration from the ground is derived in what follows.

Equations of motion of the space exploration vehicle with the electronic unit 301 ignoring damping and input from the ground are derived as (1) and (2).

$$m_1 \ddot{x}_1 + k_1(x_1 - x_2) = 0 \tag{1}$$

$$m_2 \ddot{x}_2 - k_1(x_1 - x_2) + k_2(x_2 - x_3) = 0 \tag{2}$$

where $x_1$ is a vertical displacement of the electronic unit 301 [m], $x_2$ is a vertical displacement of the vehicle mechanism 303 [m], $x_3$ is a vertical displacement of the ground, $m_1$ is a mass of the electronic unit 301 [kg], $m_2$ is a mass of the vehicle mechanism 303 [kg], $k_1$ is a stiffness of the mechanical fixer 302 between the electronic unit 301 and the vehicle mechanism 303 [N/m], and $k_2$ is a stiffness of the ground contacting mechanism 304 [N/m].

Rewriting (1) and (2) in a matrix form yields (3).

$$M\ddot{x} + Kx = f \tag{3}$$

$$M = \begin{bmatrix} m_1 & 0 \\ 0 & m_2 \end{bmatrix}, K = \begin{bmatrix} k_1 & -k_1 \\ -k_1 & k_1 + k_2 \end{bmatrix},$$

$$x = \begin{bmatrix} x_1 \\ x_2 \end{bmatrix}, f = \begin{bmatrix} 0 \\ k_2 x_3 \end{bmatrix}$$

where M is a mass matrix, K is a stiffness matrix, x is a generalized coordinate, and f is a generalized force.

Derivation of natural frequencies of (3) is expounded in what follows. First, generalized coordinate is expressed by using eigenvector and eigenvalue as in (4).

$$x = v e^{st} \tag{4}$$

where $v$ is the eigenvector, and s is the eigenvalue.

Substituting (4) into a homogeneous equation of (3) yields an eigenvalue problem in (5).

$$(s^2 M + K)v = 0 \tag{5}$$

For nontrivial solutions (6) holds.

$$|s^2 M + K| = \begin{vmatrix} s^2 m_1 & -k_1 \\ -k_1 & s^2 m_2 + k_1 + k_2 \end{vmatrix} \tag{6}$$

$$= m_1 m_2 s^4 + (m_1 k_1 + m_1 k_2 + m_2 k_1)s^2 + k_1 k_2 = 0$$

Solving (6) for $s^2$ yields (7).

$$s^2 = \frac{-(m_1 k_1 + m_1 k_2 + m_2 k_1) \pm \sqrt{D}}{m_1 m_2} \tag{7}$$

$$D = (m_1 k_1 + m_1 k_2 + m_2 k_1)^2 - 4 m_1 m_2 k_1 k_2$$

where D is a discriminant

Substituting (8) into (7) yields natural frequencies in (9) and (10).

$$s = j\omega \tag{8}$$

$$\omega_1 = \sqrt{\frac{m_1 k_1 + m_1 k_2 + m_2 k_1 - \sqrt{D}}{m_1 m_2}} \tag{9}$$

$$\omega_2 = \sqrt{\frac{m_1 k_1 + m_1 k_2 + m_2 k_1 + \sqrt{D}}{m_1 m_2}} \tag{10}$$

It is known from (7) that both (9) and (10) are positive real numbers. Resonance of the electronic unit 301 occurs at damped frequencies slightly lower than the natural frequencies given by (9) and (10).

In space missions, an ambient temperature of the space exploration vehicle can vary between −200 [C] and +200 [C] due to the absence of atmosphere causing the stiffness of the mechanical fixer 302 and the stiffness of the ground contacting mechanism 304 to change by a large amount during the mission whereas the mass of the electronic unit $m_1$ and the mass of the vehicle mechanism $m_2$ are not influenced by the ambient temperature. It follows from (9) and (10) that an increase of the ambient temperature leads to a decrease of the stiffness of the mechanical fixer 302 and the stiffness of the ground contacting mechanism 304 resulting in a decrease of first and second natural frequencies. Hence, at higher ambient temperature frequency of the vibration from the ground becomes closer to the natural frequencies of the space exploration vehicle, and the space exploration vehicle can resonate when traveling on an uneven terrain and the electronic unit 301 can be damaged.

To prevent the damage to the electronic unit 301 due to the mechanical vibrations, transient response of the electronic unit 301 after a sudden stop of the space exploration vehicle is used to identify the first and the second natural frequencies and a first and a second damping ratios. Then the travel speed of the space exploration vehicle is adjusted based on a plurality of identified natural frequencies and damping ratios to prevent the resonance of the space exploration vehicle caused by the vibration from the ground. First, the procedure to identify the first and the second natural frequencies as well as the first and the second damping ratios is derived.

Assuming the electronic unit 301 incorporates an accelerometer to measure an acceleration of the electronic unit 301 in vertical direction, a vertical displacement of the electronic unit 301 is obtained by taking a second order time integration of the measured acceleration of the electronic unit 301. The displacement of the electronic unit 301 after a sudden stop following a horizontal motion of the space exploration vehicle on an uneven terrain is expressed as in (11).

$$x_1 = e^{-\sigma_1 t}[a_1 \cos(\omega_{d1} t) + b_1 \sin(\omega_{d1} t)] + e^{-\sigma_2 t}[a_2 \cos(\omega_{d2} t) + b_2 \sin(\omega_{d2} t)] \quad (11)$$

where $\omega_{d1}$ is a damped natural frequency of a first mode (hereinafter referred to as "the first damped natural frequency") [rad/s], $\omega_{d2}$ is a damped natural frequency of a second mode (hereinafter referred to as "the second damped natural frequency") [rad/s], $\sigma_1$ is a rate of convergence of the first mode [rad/s], $\sigma_2$ is a rate of convergence of the second mode [rad/s], and $a_1$, $b_1$, $a_2$, $b_2$ are coefficients determined by a plurality of initial conditions. It must be noted that the dynamic behavior of the space exploration vehicle can be expressed as a linear combination of a plurality of modes, approximately. Among the plurality of modes, the one with the lowest frequency is referred to as "the first mode", and the one with the second lowest frequency is referred to as "the second mode".

Laplace transform of (11) yields (12).

$$X_1(s) = a_1 \frac{s + \sigma_1}{(s + \sigma_1)^2 + \omega_{d1}^2} + b_1 \frac{\omega_{d1}}{(s + \sigma_1)^2 + \omega_{d1}^2} + a_2 \frac{s + \sigma_2}{(s + \sigma_2)^2 + \omega_{d2}^2} + b_2 \frac{\omega_{d2}}{(s + \sigma_2)^2 + \omega_{d2}^2} \quad (12)$$

where $X_1(s)$ is a Laplace transform of the displacement of the electronic unit 301 [m].

Characteristics equation of (12) is obtained as (13).

$$\alpha_1(s) = (s^2 + 2\sigma_1 s + \omega_{d1}^2 + \sigma_1^2)(s^2 + 2\sigma_2 s + \omega_{d2}^2 + \sigma_2^2) \quad (13)$$

The first damped natural frequency $\omega_{d1}$ and the second damped natural frequency $\omega_{d2}$ are obtained as breakpoints of magnitude plot of (12) at which asymptote changes slope by −40 [dB/dec]. A damping ratio of the first mode (hereinafter referred to as "the first damping ratio") $\zeta_1$ is expressed using a quality factor of the first mode (hereinafter referred to as "the first quality factor") $Q_1$ which is a magnitude ratio of a peak of a Bode magnitude plot of (12) at the first damped natural frequency $\omega_{d1}$ above its asymptote as (14).

$$\zeta_1 = \frac{1}{2Q_1} \quad (14)$$

Likewise, a damping ratio of the second mode (hereinafter referred to as "the second damping ratio") $\zeta_2$ is expressed as (15) using a quality factor of the second mode (hereinafter referred to as "the second quality factor") $Q_2$.

$$\zeta_2 = \frac{1}{2Q_2} \quad (15)$$

Next, a procedure to prevent the resonance of the space exploration vehicle using the identified first damped natural frequency, the identified second damped natural frequency, the identified first damping ratio and the identified second damping ratio is derived.

Under an assumption that a roughness of the terrain does not change sharply as the space exploration vehicle travels, a plurality of frequencies of a vibration from the ground are proportional to a travel speed. Hence, a critical travel speed $v_c$ at which the space exploration vehicle resonates can be obtained by finding a ratio of the travel speed to a highest dominant frequency of the displacement of the electronic unit 301 at steady state when traveling at a constant speed. If the highest dominant frequency of the displacement of the electronic unit 301 when traveling at $v_m$ is found to be $\omega_m$ by taking a fast Fourier transform of the displacement of the electronic unit 301, the ratio of the travel speed to the highest dominant frequency of the displacement of the electronic unit 301 c is obtained as (16).

$$c = \frac{v_m}{\omega_m} \quad (16)$$

Using (16) the critical travel speed $v_c$ is found as (17).

$$v_c = c\omega_{d1} \quad (17)$$

By selecting the travel speed $v_m$ sufficiently low, the critical travel speed $v_c$ can be found from (17) without approaching the first damped natural frequency $\omega_{d1}$ at which the displacement of the electronic unit $x_1$ grows and the electronic unit 301 may be damaged. To prevent the resonance of the space exploration vehicle and a damage to the electronic unit 301, a threshold of the travel speed is selected such that a vibration power does not exceed half of the one at resonance. Bandwidth of a first resonance peak $\Delta \omega_1$, which is a difference between a larger half-power-point and a smaller half-power-point is expressed as (18). The half-power-points are obtained as two frequencies at which a magnitude of the Laplace transform of the displacement of the electronic unit 301 becomes $1/\sqrt{2}$ times of a magnitude of the first resonance peak.

$$\Delta \omega_1 = \frac{\omega_1}{Q_1} \quad (18)$$

where the first natural frequency $\omega_1$ is obtained using (14) as (19).

$$\omega_1 = \frac{\omega_{d1}}{\sqrt{1-\zeta_1^2}} \quad (19)$$

Using the bandwidth of the first resonance peak $\Delta\omega_1$, the threshold of the travel speed $v_t$ is obtained as (20).

$$v_t = v_c - cc_s \frac{\Delta\omega_1}{2} \quad (20)$$

where $c_s$ is a safety factor that is a real number strictly greater than 1. The greater the safety factor, the smaller an amplification of the vibration transmitted from the ground to the electronic unit 301 and the smaller a risk of damage thereof.

By traveling slower than the threshold of the travel speed $v_t$ in (20), the resonance of the space exploration vehicle and the damage to the electronic unit 301 due to the vibration from the ground can be prevented.

The space exploration vehicle can be equipped with a plurality of thermocouples to measure an ambient temperature, and if the ambient temperature varies from the one when (12) is calculated, the space exploration vehicle makes a sudden stop following a horizontal motion and the aforementioned procedure whereby the electronic unit 301 generates a control signal to perform a predetermined space mission while minimizing the damage to the electronic unit 301 due to the vibration from the ground is repeated.

Figure 1:
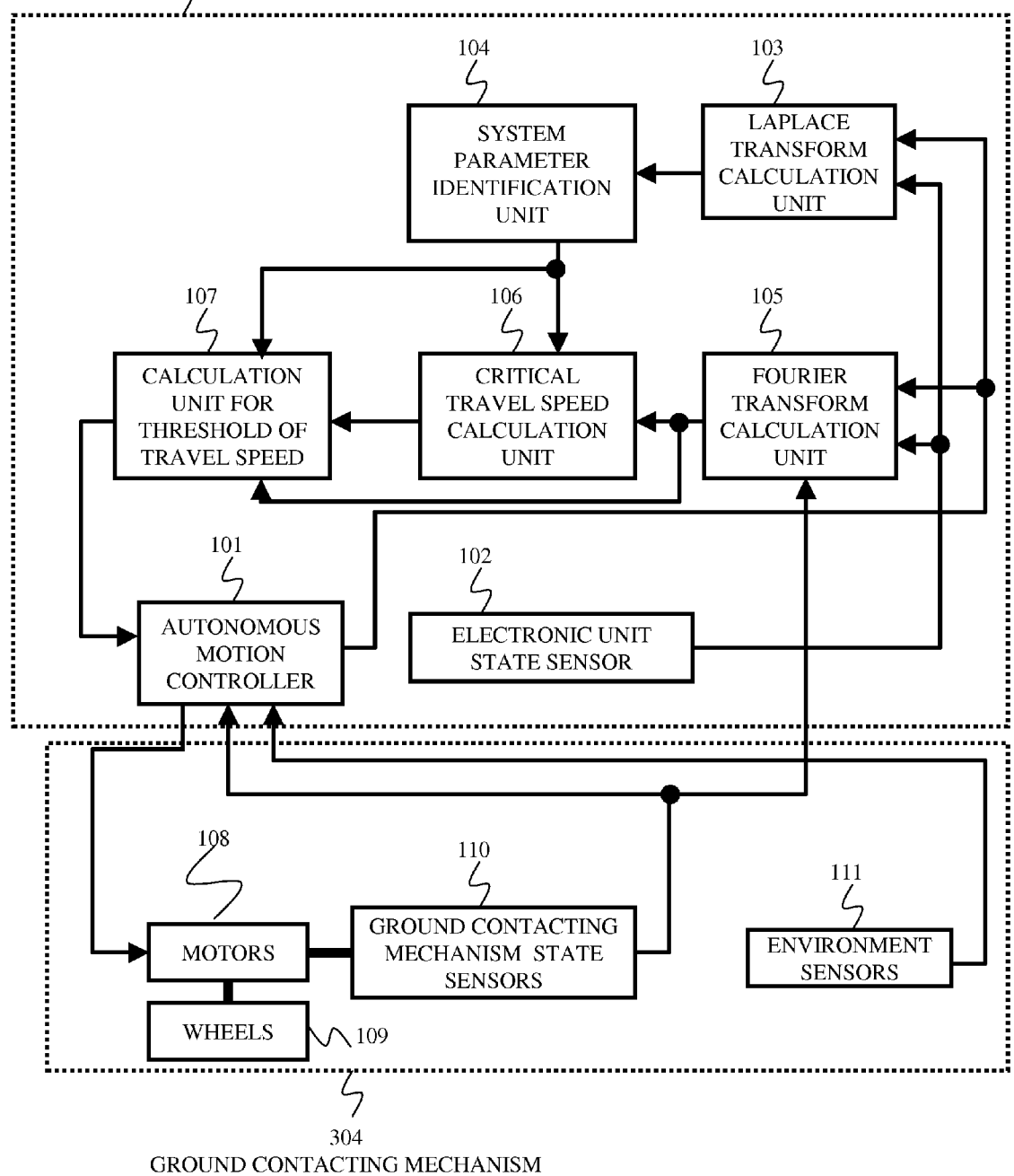
FIG. 1 is a block diagram of a protective apparatus for an electronic unit and a ground contacting mechanism in accordance with an exemplary embodiment of the invention.

An implementation of the aforementioned procedure is described using FIG. 1. FIG. 1 is a block diagram of a protective apparatus for the electronic unit and the ground contacting mechanism. The protective apparatus for the electronic unit 100 includes: an autonomous motion controller 101, an electronic unit state sensor 102, a Laplace transform calculation unit 103, a system parameter identification unit 104, a Fourier transform calculation unit 105, a critical travel speed calculation unit 106, and a calculation unit for threshold of travel speed 107. The ground contacting mechanism 304 includes: a plurality of motors 108, a plurality of wheels 109, a plurality of ground contacting mechanism state sensors 110, and a plurality of environment sensors 111.

The autonomous motion controller 101 operates in two operation modes: a parameter identification mode, and a normal operation mode. The parameter identification mode is an operation mode wherein a plurality of parameters describing a dynamics of the space exploration vehicle are identified, and the normal operation mode is an operation mode wherein the space exploration vehicle conducts the predetermined space missions. The parameter identification mode is selected if the autonomous motion controller 101 is at a beginning of the space mission or if it receives a plurality of environmental variables from the plurality of environment sensors 111 that deviate from the ones measured previously by more than a predetermined amount. The normal operation mode is selected otherwise. One example of the plurality of environmental variables is two temperatures measured at two different locations on the electronic unit 301.

In the parameter identification mode, the autonomous motion controller 101 sends a control signal to the plurality of motors 108, and a selected operation mode to the Laplace transform calculation unit 103 and the Fourier transform calculation unit 105. Then, the autonomous motion controller 101 receives a plurality of ground contacting mechanism states from the plurality of ground contacting mechanism state sensors 110.

The control signal is a plurality of motor currents such that the space exploration vehicle travels at a constant travel speed for a predetermined time interval and makes a sudden stop. The series of motions of the space exploration vehicle is hereinafter referred to as "identification motion". The predetermined time interval, hereinafter referred to as "identification motion time interval", is selected as a time interval wherein an electronic unit state reaches steady state.

The Laplace transform calculation unit 103 receives the selected operation mode that is "the parameter identification mode", and a measured electronic unit state from the electronic unit state sensor 102. Then, the Laplace transform calculation unit 103 calculates a Laplace transform of the measured electronic unit state (hereinafter referred to as "Laplace transform of the measured electronic unit state") and sends it to the system parameter identification unit 104. One example of the Laplace transform of the measured electronic unit state is given as (12).

The system parameter identification unit 104 receives the Laplace transform of the measured electronic unit state, and identifies a plurality of system parameters. Then, the system parameter identification unit 104 sends a plurality of identified system parameters to the critical travel speed calculation unit 106, and to the calculation unit for threshold of travel speed 107. One example of the plurality of identified system parameters (hereinafter referred to as "identified first damping ratio" and "identified first natural frequency") is given in (14) and (19).

The Fourier transform calculation unit 105 receives the selected operation mode that is "the parameter identification mode", and waits until the selected operation mode becomes "the normal operation mode".

In the normal operation mode, on the other hand, the autonomous motion controller 101 sends the selected operation mode to the Laplace transform calculation unit 103 and the Fourier transform calculation unit. Then, the autonomous motion controller 101 receives the plurality of ground contacting mechanism states from the plurality of ground contacting mechanism state sensors 110, and the threshold of travel speed from the calculation unit for threshold of travel speed 107. The autonomous motion controller 101, further, sends the control signal to the plurality of motors 108 which are mechanically connected to the plurality of wheels 109.

The control signal is a plurality of motor currents such that the space exploration vehicle travels in a direction required to perform the predetermined space mission at the travel speed not exceeding the threshold of travel speed from the calculation unit for threshold of travel speed 107. The autonomous motion controller 101 generates the plurality of control signals utilizing a feedback control wherein the plurality of the ground contacting mechanism states converge to a plurality of values required by the space exploration vehicle to travel in a direction that the space mission requires at the travel speed not exceeding the threshold of travel speed. One example of the control signal is a set of motor currents wherewith the wheels on the right side of the space exploration vehicle rotate faster than the ones on the left side to make a left turn concurrently a center of gravity of the space exploration vehicle travels at a speed not exceeding the threshold of travel speed.

The Laplace transform calculation unit 103 receives the selected operation mode that is "the normal operation mode", and waits until the selected operation mode becomes "the parameter identification mode".

The Fourier transform calculation unit 105 receives the selected operation mode that is "the normal operation mode", the measured electronic unit state from the electronic unit state sensor 102, and the ground contacting mechanism state from the plurality of ground contacting mechanism state sensors 110. Then, the Fourier transform calculation unit 105 calculates the ratio of the ground contacting mechanism state to the highest dominant frequency of the measured electronic unit state, and sends it to the critical travel speed calculation unit 106, and to the calculation unit for threshold of travel speed 107. One example of the ratio of the ground contacting mechanism state to the highest dominant frequency of the measured electronic unit state is a ratio of the travel speed to the highest dominant frequency of the displacement of the electronic unit 301 in (16).

The critical travel speed calculation unit 106 receives the plurality of identified system parameters from the system parameter identification unit 104, and the ratio of the travel speed to the highest dominant frequency of the measured electronic unit state from the Fourier transform calculation unit 105. Then, the critical travel speed calculation unit 106 calculates a critical travel speed at which the highest dominant frequency of the measured electronic unit state coincides with the first damped natural frequency of the space exploration vehicle, and sends it to the calculation unit for threshold of travel speed 107. One example of the critical travel speed is given in (17).

The calculation unit for threshold of travel speed 107 receives the plurality of identified system parameters from the system parameter identification unit 104, the ratio of the travel speed to the first dominant frequency of the electronic unit state from the Fourier transform calculation unit 105, and the critical travel speed from the critical speed calculation unit 106. Then, the calculation unit for threshold of travel speed 107 calculates the threshold of the travel speed, which the space exploration vehicle is controlled not to exceed, as a function of the critical travel speed and the plurality of identified system parameters, and sends it to the autonomous motion controller 101. One example of the threshold of the travel speed is given in (20).

Figure 2:
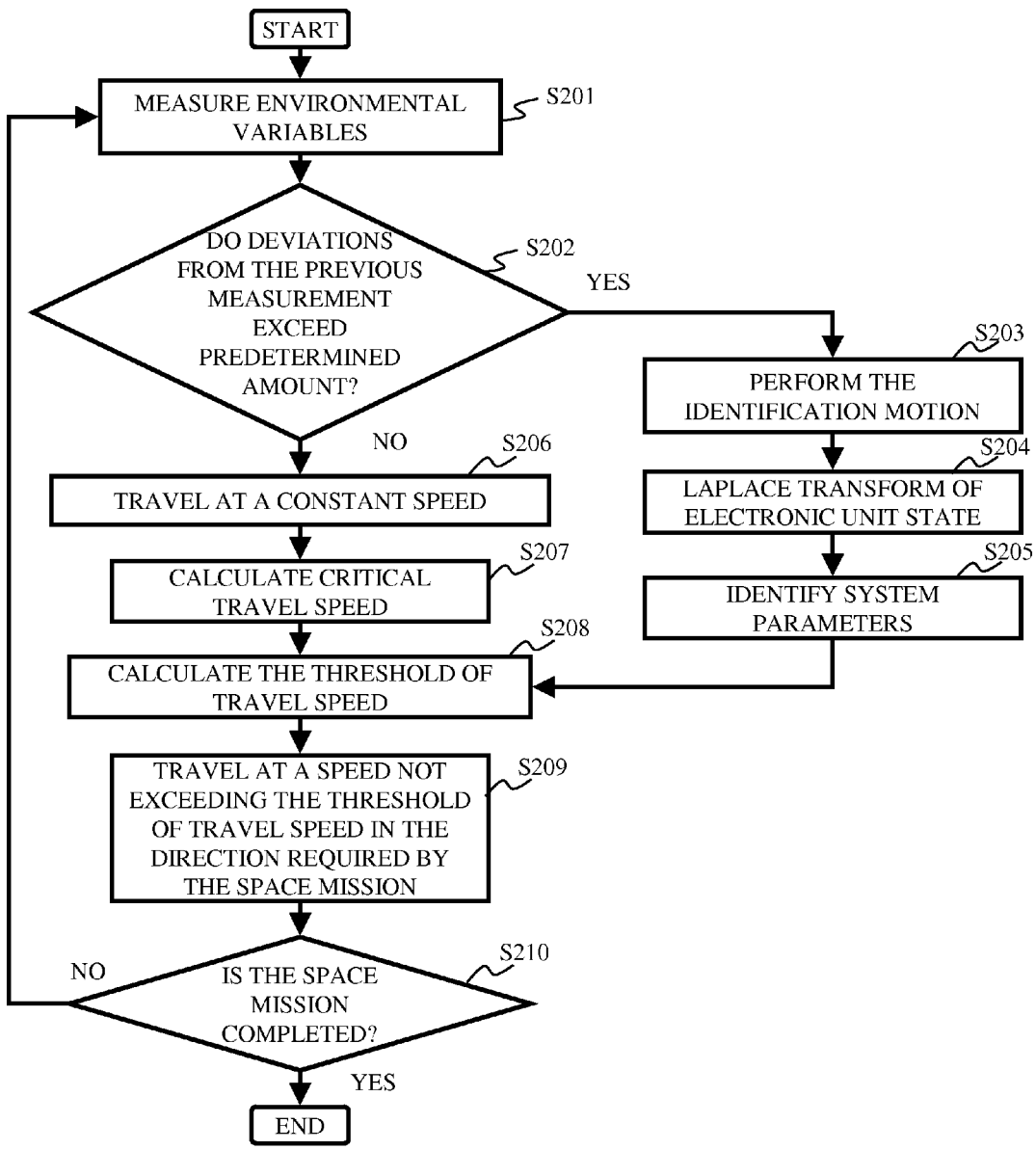
FIG. 2 is a flowchart showing a processing flow of the protective apparatus for electronic unit in accordance with an exemplary embodiment of the invention.

Next a processing flow of the protective apparatus for the electronic unit is described using FIG. 2. FIG. 2 is a flowchart showing the processing flow of the protective apparatus for the electronic unit. During the space mission, the plurality of environment sensors 111 in the ground contacting mechanism 304 measures the plurality of environmental variables such as an ambient temperature and an ambient relative humidity periodically (S201).

If the autonomous motion controller 101 is at the beginning of the space mission, or if the plurality of the measured environmental variables deviate from the ones measured previously by more than a predetermined amount, the autonomous motion controller 101 selects "the parameter identification mode" as a selected operation mode, and send it to the Laplace transform calculation unit 103 and the Fourier transform calculation unit 105 (YES of S202). Otherwise, the autonomous motion controller 101 selects "the normal operation mode" as the selected operation mode, and sends it to the Laplace transform calculation unit 103 and the Fourier transform calculation unit 105 (NO of S202).

In the parameter identification mode, the autonomous motion controller 101 sends the control signal to the plurality of motors 108 such that the space exploration vehicle makes the aforementioned identification motion (S203).

After the completion of the identification motion, the electronic unit state sensor 102 measures the electronic unit state such as the displacement of the electronic unit. Then, the Laplace transform calculation unit 103 calculates the Laplace transform of the measured electronic unit state (S204).

Using the Laplace transform of the measured electronic unit state, the system parameter identification unit 104 identifies the plurality of system parameters such as the first natural frequency and the first damping ratio. Then, the system parameter identification unit 104 sends the plurality of identified system parameters to the critical travel speed calculation unit 106 and the calculation unit for threshold of travel speed 107 (S205).

In the normal operation mode, the autonomous motion controller 101 sends the plurality of control signals to the plurality of motors 108 using a feedback control such that the space exploration vehicle moves in the direction required by the space mission at a constant travel speed (S206).

While traveling at the constant speed, the Fourier transform calculation unit 105 calculates the ratio of the travel speed to the first dominant frequency of the electronic unit state, and sends it to the critical travel speed calculation unit 106. Then, the critical travel speed calculation unit 106 calculates the critical travel speed as a function of the plurality of identified system parameters, and the ratio of the travel speed to the first dominant frequency of the electronic unit state (S207).

The calculation unit for threshold of travel speed 107 calculates the threshold of the travel speed as a function of the plurality of identified system parameters from the system parameter identification unit 104, and the critical travel speed from the critical travel speed calculation unit 106. Then, the calculation unit for threshold of travel speed 107 sends the threshold of the travel speed to the autonomous motion controller 101 (S208).

The autonomous motion controller 101 continues the feedback control of the plurality of motors 108 such that the space exploration vehicle moves in the direction required by the space mission at the speed not exceeding the threshold of the travel speed (S209).

Steps S201 through S209 are repeated during the space mission (NO of S210), and the space exploration vehicle comes to a complete stop when the space mission is completed (YES of S210).

Hereinafter, simulation results of aforementioned control processes of the protective apparatus for the electronic unit 100 in accordance with an exemplary embodiment of the invention are described in detail. The simulation assumes a Mars exploration mission by an unmanned space exploration vehicle. The parameters used in the simulation are as follows: $m_1=35$ [kg], $m_2=150$ [kg], $k_1=2.32\times10^{12}$ [N/m], $k_2=2.50\times10^6$ [N/m], $c_1=0.05$ [N·s/m], $c_2=0.05$ [N·s/m], $g_{mars}=9.8\times0.38$ [m/s$^2$], $c_s=1.65$, where $c_1$ is a viscous friction of the mechanical fixer 302 between the electronic unit 301 and the vehicle mechanism 303 [N/m], $c_2$ is a viscous friction of the ground contacting mechanism 304 [N/m], and $g_{mars}$ is a gravitational acceleration on Mars. The stiffness of the mechanical fixer 302 $k_1$ is calculated assuming the mechanical fixer 302 is made of Titanium and its thickness and area are 0.05 [m] and 1 [m$^2$] respectively. The stiffness of the ground contacting mechanism 304 $k_2$ is selected approximately assuming that the ground contacting mechanism 304 consists of a suspension system made of Titanium and six 81 [m] diameter, 23 [m] wide wheels made of Aluminum. It is assumed in the simulation that the electronic unit 301 can continue its intended operation without damage under all terrain conditions expected in the space mission if the amplification of the vibration from the ground to the electronic unit 301 does not exceed 3.17. The safety factor is selected such that the amplification of the vibration from the ground to the electronic unit 301 does not exceed 3.17. In reality, the value of the safety factor can be determined in the similar manner by experiments.

Figure 4:
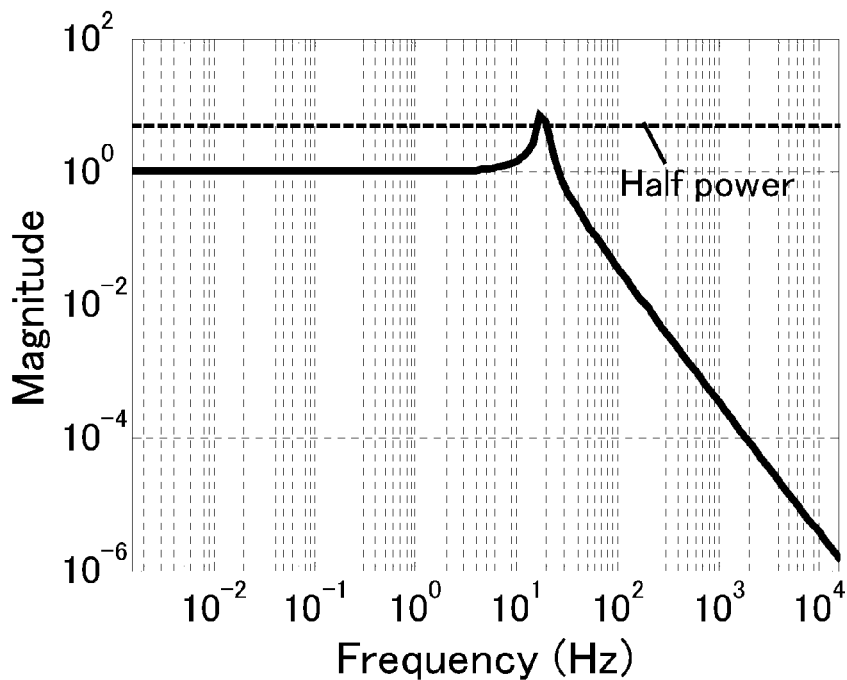
FIG. 4 is a simulation result of an exemplary embodiment of the invention showing a magnitude of a Laplace transform of the displacement of the electronic unit.

FIG. 4 is a simulation result of an exemplary embodiment of the invention showing the magnitude of the Laplace transform of the displacement of the electronic unit. In FIG. 4 the solid line represents the magnitude of the Laplace transform of the displacement of the electronic unit after performing the identification motion, and the dashed line represents the magnitude corresponding to half power. The identification motion time interval employed is 2 [s], and during the identification time interval the space exploration vehicle travels at 1 [m/s] on a terrain that causes a vibration as in FIG. 5 before making a sudden stop. The Laplace transform calculation unit 103 calculates the Laplace transform of the displacement of the electronic unit for 1 [s] after the sudden stop. Then, its magnitude in FIG. 4 is calculated by the system parameter identification unit 104. The half-power-points are obtained from the intersections of the solid line and the dashed line as 17.1 [Hz] and 23.6 [Hz], and the bandwidth of the first resonance peak $\Delta\omega_1$, which is the difference between the half-power-points, is obtained as 6.5 [Hz]. The first damped natural frequency $\omega_{d1}$ is obtained from the peak of the solid line as 20.3 [Hz].

Figure 5:
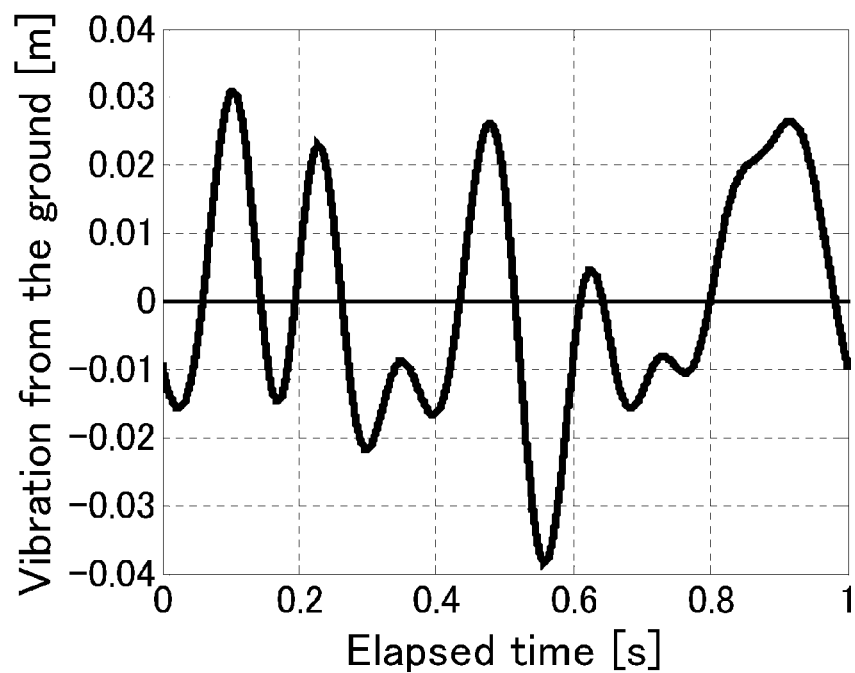
FIG. 5 is a simulation result of an exemplary embodiment of the invention showing a vibration from the ground when traveling at 1 [m/s]

FIG. 5 is a simulation result of an exemplary embodiment of the invention showing the vibration from the ground when traveling at 1 [m/s]. After the calculation of the bandwidth of the first resonance peak $\Delta\omega_1$, and the first damped natural frequency $\omega_{d1}$ by the system parameter identification unit 104, the space exploration vehicle travels at 1 [m/s] on a terrain that causes a vibration as in FIG. 5.

Figure 6:
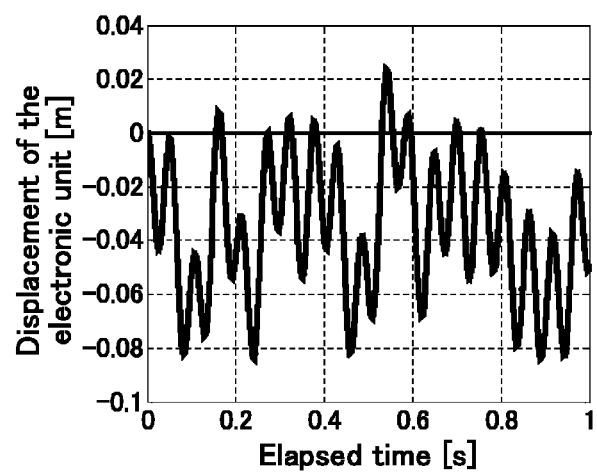
FIG. 6 is a simulation result of an exemplary embodiment of the invention showing a displacement of the electronic unit when traveling at 1 [m/s]

FIG. 6 is a simulation result of an exemplary embodiment of the invention showing the displacement of the electronic unit when traveling at 1 [m/s]. When the space exploration vehicle travels at 1 [m/s], the vibration from the ground in FIG. 5 propagates through the ground contacting mechanism 304, the vehicle mechanism 303 and the mechanical fixer 302, and causes the displacement of the electronic unit $x_1$ to vary as in FIG. 6. The amplitude of the displacement of the electronic unit in this case is 0.092 [m], and the ratio of the amplitude of vibration of the electronic unit 301 to that of the ground vibration is 1.42.

Figure 7:
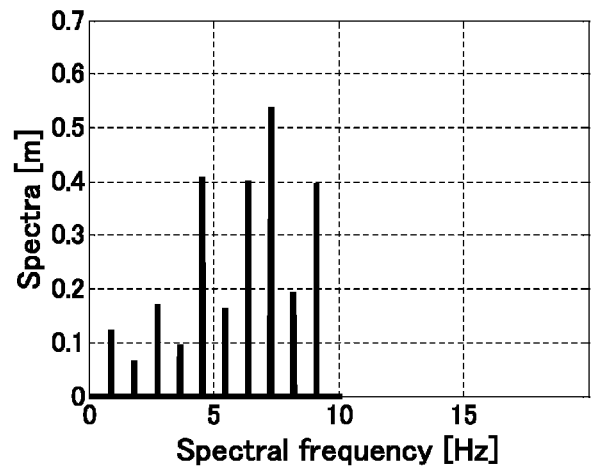
FIG. 7 is a simulation result of an exemplary embodiment of the invention showing a Fourier transform of the displacement of the electronic unit when traveling at 1 [m/s]

FIG. 7 is a simulation result of an exemplary embodiment of the invention showing the Fourier transform of the displacement of the electronic unit when traveling at 1 [m/s]. FIG. 7 shows that the displacement of the electronic unit when traveling at 1 [m/s] contains frequency contents not exceeding 10 [Hz]. Hence, the ratio of the travel speed to the highest dominant frequency of the displacement of the electronic unit 301 c is obtained from (16) as 62.83.

Figure 8:
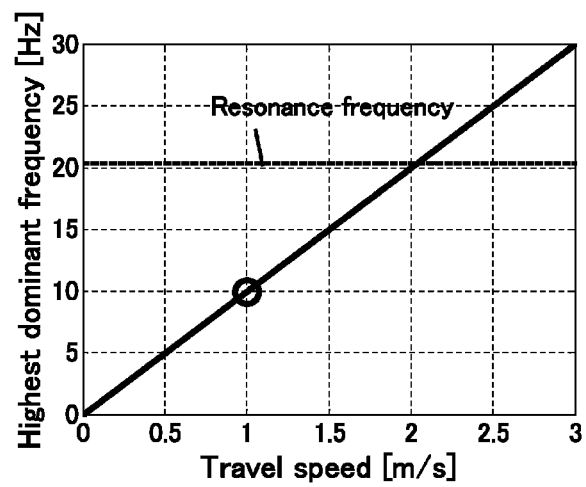
FIG. 8 is a simulation result of an exemplary embodiment of the invention showing a relation between a travel speed and a highest dominant frequency.

FIG. 8 is a simulation result of an exemplary embodiment of the invention showing a relation between the travel speed and the highest dominant frequency. In FIG. 8 the solid line represents a relation between the highest dominant frequency of the displacement of the electronic unit $x_1$ and the travel speed, the dashed line represents the first damped natural frequency $\omega_1$, and the circle represents the highest dominant frequency of the displacement of the electronic unit $x_1$ when traveling at 1 [m/s]. The critical travel speed calculation unit 106 calculates the critical travel speed $v_c$ from the intersection of the solid line and the dashed line as 2.03 [m/s]. Then the calculation unit for threshold of travel speed 107 calculates the threshold of travel speed $v_t$ using (20) as 1.5 [m/s].

A comparison between the amounts of the vibrations transmitted to the electronic unit 301 without and with the protective apparatus for the electronic unit 100 of the present invention is given using FIG. 9 through FIG. 14.

Figure 9:
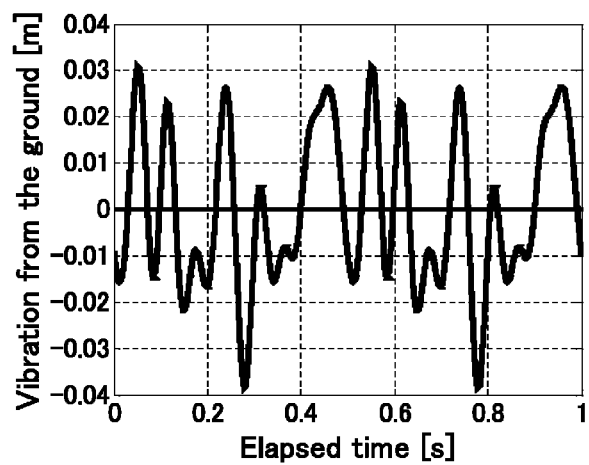
FIG. 9 is a simulation result of an exemplary embodiment of the invention showing the vibration from the ground when traveling at 2 [m/s]

FIG. 9 is a simulation result of an exemplary embodiment of the invention showing the vibration from the ground when traveling at 2 [m/s]. With the absence of the protective apparatus for the electronic unit 100 of the present invention, the travel speed of the space exploration vehicle can be increased to 2 [m/s] and the vibration as in FIG. 9 is injected from the ground to the ground contacting mechanism 304.

Figure 10:
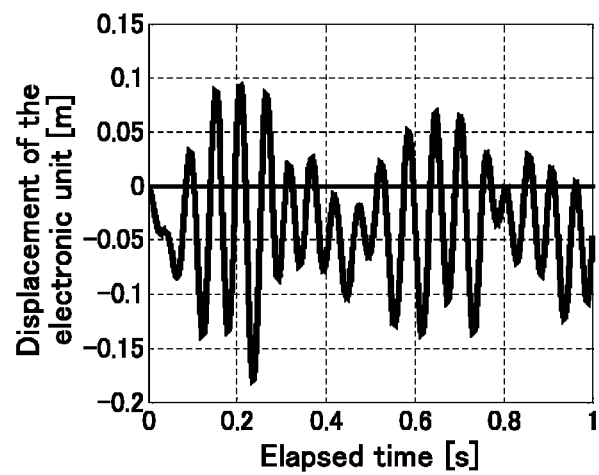
FIG. 10 is a simulation result of an exemplary embodiment of the invention showing the displacement of the electronic unit when traveling at 2 [m/s]

FIG. 10 is a simulation result of an exemplary embodiment of the invention showing the displacement of the electronic unit when traveling at 2 [m/s]. The vibration from the ground in FIG. 9 propagates through the ground contacting mechanism 304, the vehicle mechanism 303, the mechanical fixer 302 and causes the electronic unit 301 to vibrate as in FIG. 10. The amplitude of the displacement of the electronic unit in this case is 0.272 [m], and the ratio of the amplitude of the vibration of the electronic unit 301 to that of the ground vibration is 4.22. The ratio exceeds the aforementioned allowable value of 3.17 implying that the electronic unit 301 is likely to be damaged.

Figure 11:
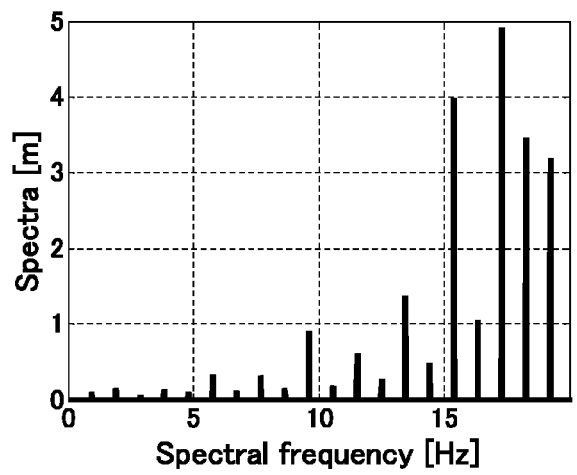
FIG. 11 is a simulation result of an exemplary embodiment of the invention showing the Fourier transform of the displacement of the electronic unit when traveling at 2 [m/s]

FIG. 11 is a simulation result of an exemplary embodiment of the invention showing the Fourier transform of the displacement of the electronic unit when traveling at 2 [m/s]. FIG. 11 shows that the displacement of the electronic unit when traveling at 2 [m/s] contains frequency contents not exceeding 20 [Hz]. Since the highest frequency content at 20 [Hz] is close to the first damped natural frequency of the space exploration vehicle of 20.3 [Hz], the vibration of the electronic unit 301 is amplified significantly as in FIG. 10.

Figure 12:
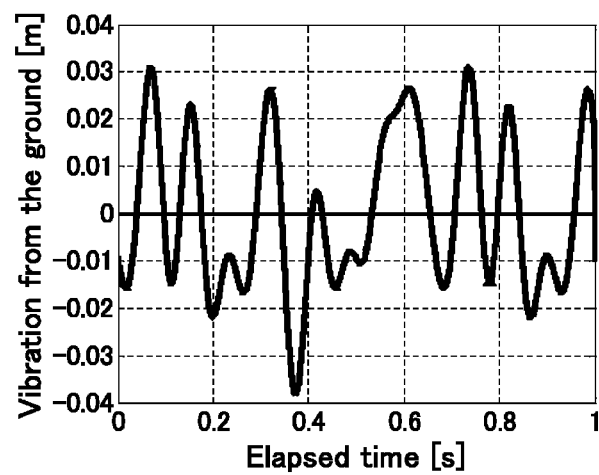
FIG. 12 is a simulation result of an exemplary embodiment of the invention showing the vibration from the ground when traveling at 1.5 [m/s]

FIG. 12 is a simulation result of an exemplary embodiment of the invention showing the vibration from the ground when traveling at 1.5 [m/s]. With the presence of the protective apparatus for the electronic unit 100 of the present invention, the travel speed of the space exploration vehicle is limited at the threshold of the travel speed 1.5 [m/s] generated by the calculation unit for threshold of travel speed 107 using (20). When traveling at 1.5 [m/s], the vibration from the ground varies as in FIG. 12.

Figure 13:
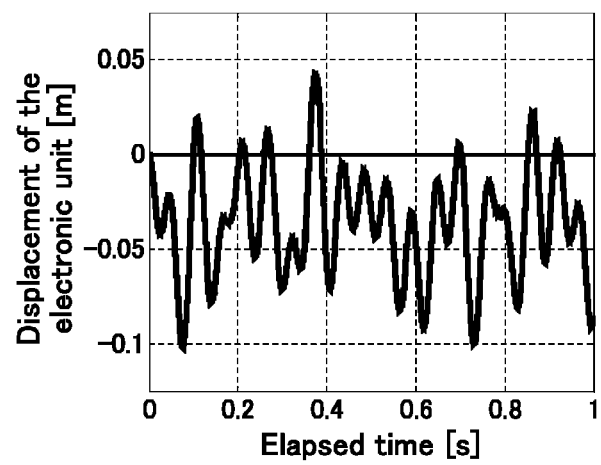
FIG. 13 is a simulation result of an exemplary embodiment of the invention showing the displacement of the electronic unit when traveling at 1.5 [m/s]

FIG. 13 is a simulation result of an exemplary embodiment of the invention showing the displacement of the electronic unit when traveling at 1.5 [m/s]. The amplitude of the displacement of the electronic unit is 0.121 [m] in this case, and the ratio of the amplitude of the vibration of the electronic unit 301 to that of the ground vibration is 1.87. Hence, the present invention successfully limits the amplitude of the vibration of the electronic unit 301 to a level wherein the electronic unit 301 is designed to continue its intended operation without a damage.

Figure 14:
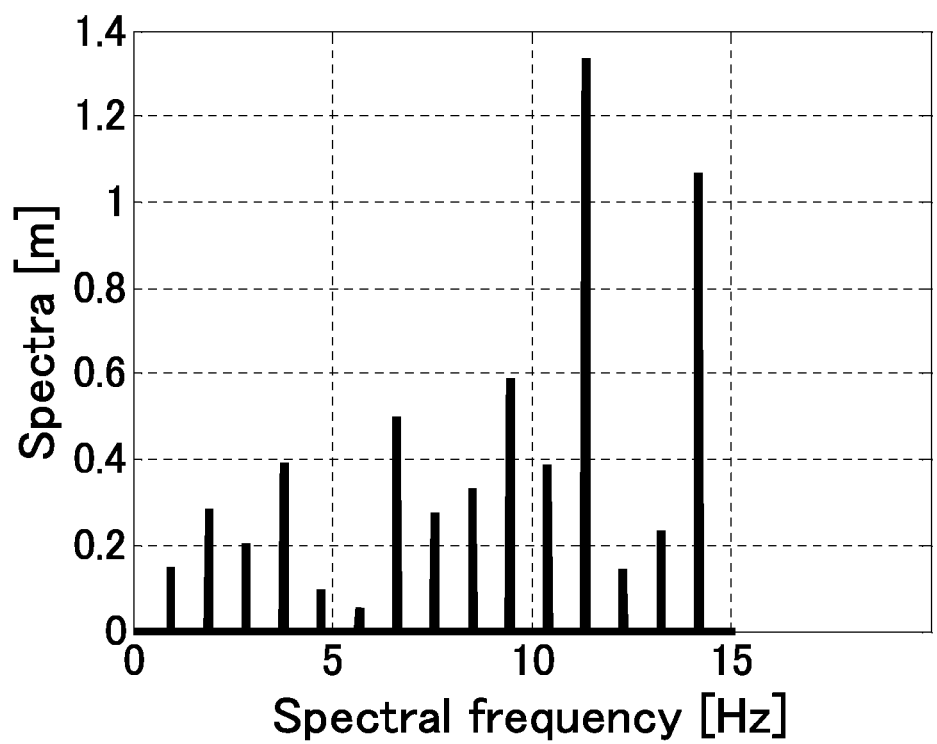
FIG. 14 is a simulation result of an exemplary embodiment of the invention showing the Fourier transform of the displacement of the electronic unit when traveling at 1.5 [m/s].

FIG. 14 is a simulation result of an exemplary embodiment of the invention showing the Fourier transform of the displacement of the electronic unit when traveling at 1.5 [m/s]. FIG. 14 indicates that the highest dominant frequency component of the vibration of the electronic unit 301 does not exceed 15 [Hz] that is lower than the lower half-power-point of 17.1 [Hz]. Thus, the resonance of the electronic unit 301 is avoided by the present invention.

It should be noted that the prior art in U.S. Pat. No. 5,436,839, if applied to the space exploration vehicle, is unable to avoid the resonance of the electronic unit 301 taking into account a terrain condition, and a dependency of material properties of the mechanical fixer 302, the vehicle mechanism 303 and the ground contacting mechanism 304 to sharply changing environmental conditions including an ambient temperature of a planet where the space mission is conducted. Therefore, the electronic unit 301 can be damaged by the vibration transmitted from the ground even by traveling along a safe path estimated by a technique given in U.S. Pat. No. 5,436,839.

Although the above simulation assumes a six-wheeled Mars exploration vehicle with the ground contacting mechanism 304 made of Titanium and Aluminum, the present invention can be applied, with a minor modification apparent to those skilled in the art, to a variety of space missions such as Lunar mission and to the space exploration vehicles with a different ground contacting mechanism such as tracked space exploration vehicles, the ones with different number of wheels, and the ones made of different materials including smart materials such as piezoelectric material.

The protective apparatus of the electronic unit in the foregoing embodiment can be realized as an electrical/electronic/programmable electronic system. Examples of the electrical/electronic/programmable electronic system includes but not limited to an application specific integrated circuit (ASIC) and a microcontroller.

The feedback control that the autonomous motion controller 101 conducts, in the foregoing embodiment, to cause a desired motion of the plurality of motors 108 may be designed based on a classical control, a modern control, a post-modern control (such as fuzzy control, adaptive control and neural network control), a linear control or a nonlinear control (such as sliding mode control).

While, in the foregoing embodiment, the vibration of the electronic unit 301 in a vertical direction is considered, the present invention can also take into account horizontal vibrations as well as rotational vibrations transmitted from the ground by applying the principle of the present invention to a mathematical model of the space exploration vehicle containing translational degrees of freedom (for example X-, Y- and Z-directions in the Cartesian coordinate system) and rotational degrees of freedom (for example pitch, yaw and roll directions). Application of the present invention to such mathematical model can prevent resonances of translational modes and rotational modes of the electronic unit 301, and can protect the electronic unit 301 from translational and rotational vibrations.

The described embodiments of the present invention are only exemplary and numerous variations thereof apparent to those skilled in the art are intended to be within the scope of the present invention as defined in the following claims.

The invention claimed is:

1. A protective device for a space exploration vehicle comprising an electronic unit for navigating the space exploration vehicle to a destination, a vehicle mechanism for supporting the electronic unit, a mechanical fixer for attaching the electronic unit to the vehicle mechanism, and a ground contacting mechanism for facilitating transportation of the space exploration vehicle while supporting the electronic unit, the mechanical fixer, and the vehicle mechanism, where the ground contacting mechanism includes a plurality of wheels for generating a traction against a ground and for causing motions of the space exploration vehicle across the ground, a plurality of motors for driving the plurality of wheels, a plurality of ground contacting mechanism state sensors for measuring a plurality of the ground contacting mechanism states such as a plurality of rotational speeds of the plurality of wheels, and a plurality of environment sensors for measuring a plurality of environmental variables such as an ambient temperature, the protective device comprising:

an autonomous motion controller selecting a parameter identification mode if the autonomous motion controller is at a beginning of a space mission or receives the plurality of environmental variables from the plurality of environment sensors that deviate from the ones measured previously by more than a predetermined amount, selecting a normal operation mode if the autonomous motion controller is not at the beginning of the space mission and does not receive the plurality of environmental variables from the plurality of environment sensors that deviate from the ones measured previously by more than the predetermined amount, sending a control signal to the plurality of motors and the selected operation mode if the parameter identification mode is selected, where the control signal is a plurality of motor currents such that the space exploration vehicle travels at a constant travel speed for a predetermined time interval wherein an electronic unit state reaches steady state and makes a sudden stop, and sending a control signal required to perform the space mission if the normal operation mode is selected;

a Laplace transform calculation unit receiving the selected operation mode and the measured electronic unit state from the electronic unit state sensor, calculating and sending a Laplace transform of the measured electronic unit state if in the parameter identification mode, and waiting until the selected operation mode becomes the parameter identification mode if in the normal operation mode;

a system parameter identification unit receiving the Laplace transform of the measured electronic unit state, identifying and sending a plurality of identified system parameters;

a Fourier transform calculation unit receiving the selected operation mode and waiting until the selected operation mode becomes the normal operation mode if in the parameter identification mode, receiving the selected operation mode, the measured electronic unit state from the electronic unit state sensor, and the ground contacting mechanism state from the plurality of ground contacting mechanism state sensors, calculating and sending a ratio of the ground contacting mechanism state to a highest dominant frequency of the measured electronic unit state if in the normal operation mode;

a critical travel speed calculation unit receiving the plurality of identified system parameters from the system parameter identification unit, the ratio of the travel speed to the highest dominant frequency of the measured electronic unit state from the Fourier transform calculation unit, calculating and sending a critical travel speed at which the highest dominant frequency of the measured electronic unit state coincides with a first damped natural frequency of the space exploration vehicle; and a calculation unit for threshold of travel speed receiving the plurality of identified system parameters from the system parameter identification unit, the ratio of the travel speed to the first dominant frequency of the electronic unit state from the Fourier transform calculation unit, and the critical travel speed from the critical speed calculation unit, calculating and sending the threshold of the travel speed, which the space exploration vehicle is controlled not to exceed, as a function of the critical travel speed and the plurality of identified system parameters.

* * * * *